US008443191B2

(12) United States Patent
Beckwith et al.

(10) Patent No.: US 8,443,191 B2
(45) Date of Patent: May 14, 2013

(54) SYSTEM AND METHOD FOR ACCESSING INFORMATION RESOURCES USING CRYPTOGRAPHIC AUTHORIZATION PERMITS (75) Inventors: Reynolds Wiliam Beckwith, Great Falls, VA (US); Jeffrey Grant Marshall, Herndon, VA (US); Jeffrey William Chilton, Reston, VA (US)

(73) Assignee: Objective Interface Systems, Inc., Herndon, VA (US)

( * ) Notice: Subject to any disclaimer, the term of this patent is extended or adjusted under 35 U.S.C. 154(b) by 936 days.

(21) Appl. No.: 11/783,359

(22) Filed: Apr. 9, 2007

(65) Prior Publication Data
US 2008/0250253 A1 Oct. 9, 2008

(51) Int. Cl.
*H04L 9/32* (2006.01)
*G06F 21/00* (2006.01)

(52) U.S. Cl.
USPC ............................. 713/167; 726/17; 713/189

(58) Field of Classification Search .................. 713/164, 713/167; 726/17
See application file for complete search history.

(56) References Cited

U.S. PATENT DOCUMENTS

| 5,761,305 A | 6/1998 | Vanstone et al. |
| 5,878,144 A * | 3/1999 | Aucsmith et al. ................ 380/30 |
| 6,185,678 B1 * | 2/2001 | Arbaugh et al. .................. 713/2 |
| 6,772,416 B1 | 8/2004 | White et al. |
| 7,797,531 B2 * | 9/2010 | Suzuki .......................... 713/156 |
| 2006/0198358 A1 | 9/2006 | Beckwith et al. |
| 2007/0255942 A1 * | 11/2007 | Weller et al. .................. 713/151 |

OTHER PUBLICATIONS

L. Law, et al., "An efficient protocol for authenticated key agreement," *Designs Cods and Cryptography*, vol. 28, pp. 119-134 (2003).

* cited by examiner

*Primary Examiner* — Gilberto Barron, Jr.
*Assistant Examiner* — Devin Almeida
(74) *Attorney, Agent, or Firm* — Venable LLP; Robert S. Babayi; Christopher B. Tokarczyk (57) ABSTRACT A system and method for securing information associates a party with a node that communicates messages over one or more channels based on a channel access privilege. One or more authorities sign a cryptographic authorization permit (CAP) to authorize the channel access privilege, which can be a write privilege or a read privilege. In one embodiment, the authorization for the channel access privilege is based on a public key issued by an authority and the CAP comprises a cryptographic certificate digitally signed by the authority.

24 Claims, 4 Drawing Sheets

SYSTEM AND METHOD FOR ACCESSING INFORMATION RESOURCES USING CRYPTOGRAPHIC AUTHORIZATION PERMITS

FIELD OF THE INVENTION

The present invention generally relates to the field of information security and more particularly to controlling and securing access to information resources, such as communication channels and data storage devices.

BACKGROUND

Cryptography is a discipline of mathematics and computer science concerned with information security and related issues, particularly encryption/decryption of information and authentication of identity. In so called "data-in-movement" applications, cryptography has been applied extensively for securing information flows amongst communicating parties over communication channels. Cryptography has also been applied for securing information in data storage mediums and databases in what is know as "data-at-rest" applications.

Symmetric cryptography and asymmetric cryptography are known classes of algorithms that use keys having one or more secret parameters for encryption and decryption of information and authentication. In symmetric cryptography, keys represent shared secrets which are known a priori amongst communicating parties. Systems secured with symmetric-key algorithms use relatively simple encryption and decryption computations. Such systems also require choosing, distributing and maintaining the shared secret key amongst the communicating parties. In order to avoid security breach and potential discovery by a cryptographic adversary, the shared secret key must be changed often and kept secure during distribution and in service, making symmetric-key cryptography impractical and hard to scale for securing large systems.

Asymmetric cryptography uses a pair of mathematically related keys known as public and private keys, which obviate the need for prior knowledge of a shared secret key amongst communicating parties. While computationally more intensive, asymmetric key cryptography overcomes scalability disadvantages associated with symmetric key cryptography. Public key infrastructure (PKI) is a known system for securing information using asymmetric key cryptography. In such system, a party at one computer station digitally signs messages using a randomly created private key and a party at another computer station verifies the signature using a distributed public key derived from the private key. The public keys of the communicating parties are distributed in corresponding identity certificates issued by one or more trusted parties called certificate authorities (CAs). In this way, PKI keeps messages secret from those that do not possess the private key and the identity certificates allows anyone having the associated public key to verify that the message was created with the private key. Consequently, PKI enables communicating parties to be authenticated to each other and to use the information in identity certificates to encrypt and decrypt messages, thereby establishing message confidentiality, integrity and authentication without advance exchange of shared secret keys.

A public key certificate, also known as an identity certificate, includes a digital signature that binds a public key with an identity represented by such information as name, e-mail address, etc. A CA digitally signing the certificate attests that the public key belongs to the identity, i.e., the person, organization, server, or other entity noted in the certificate. The CA is often a trusted third party that issues digital certificates for use by communicating parties. The requirement of trust obligates the CA to somehow verify the identity credentials of communicating parties. It is assumed that if the parties trust the CA and can verify its signature, they can also verify that a public key does indeed belong to whomever is identified in the certificate.

Some enterprise-scale PKI systems rely on certificate chains to establish a party's identity. Under such scheme, a certificate may be issued by a CA whose legitimacy is established for such purpose by a higher-level CA, and so on. This produces a certificate hierarchy composed of several CAs, often more than one organization. CAs can manage issuance of certificates using various computers and assorted interoperating software packages from several sources. This makes standards critical to PKI operation. IETF PKIX working group is involved with standardization of public key certificate format, including a certification standard known as X.509.

Various point-to-point secure communication protocols that use cryptography are known. Examples of such protocols include Secure Sockets Layer (SSL), Transport Layer Security (TLS), Secure Shell (SSH) and IP Security (IP Sec). SSL and TLS provide cryptographic endpoint authentication for applications that communicate within client server based networks for preventing eavesdropping, tampering, and message forgery during communications. SSH is a set of standards and associated network protocols that allow for establishing a secure channel between a local and a remote computer. This protocol uses public-key cryptography to authenticate the remote computer. IP Sec is a standard for securing Internet Protocol (IP) communications by encrypting all IP packets for authentication, data confidentiality and message integrity.

In conventional secure systems, such as those that use the above mentioned protocols, encrypted messages are communicated over channels within the network, often through a firewall, based on authentication of identities of the communicating parties by CAs. As long as the identity of the communicating parties are authenticated, conventional secure systems allow the parties to communicate with each other over channels.

In another conventional approach, Lawrence Berkeley National Laboratory also known as Berkeley Lab has developed a system called Akenti (htti://dsd.lbl.gov/securitv/Akenti/homepage.html) that addresses the issues raised in allowing restricted access to resources which are controlled by multiple stakeholders. Akenti provides a way to express and to enforce an access control policy without requiring a central enforcer and administrative authority. The system's architecture is intended to provide scalable security services in highly distributed network environments. Akenti is designed to allow each stakeholder in the system resources to enforce its access control requirements independently of the other stakeholders. Akenti allows each stakeholder to change its requirements at any time and to be confident that the new requirements would take effect immediately, and to provide high assurance of integrity and non-repudiability in the expression of the access control requirements. Akenti makes use of digitally signed certificates capable of carrying user identity authentication, resource usage requirements ("use-conditions"), user attribute authorizations ("attribute certificates"), delegated authorization and authorization decisions split among on-line and off-line entities.

It is also known to partition or otherwise separate resources into policy-based equivalence classes and to control information flows between subjects and resources assigned to the partitions according to a Separation Kernel configuration data. For example, U.S. Pat. No. 6,772,416 discloses a computer system that supports a high degree of separation between processing elements. The computer-implemented system executes an operating system having a kernel and includes a plurality of cells. Each cell has one or more processing elements, a domain of execution and a collection of "strands" or tasks, where each strand or task is a stream of programmable machine instructions executable by the kernel of the operating system. A separation specification governs communication between the processing elements and administers the communication between the processing elements in accordance with the separation specification such that one processing element can influence the operation of another processing element only as set forth by the separation specification.

As the security needs in information systems become more advanced, however, there exists a need for a secure system and method that better manages access to information resources.

SUMMARY OF THE INVENTION

Briefly, according to the present invention, a node for an information system according to the present invention includes a separation kernel (SK) that defines a plurality of partitions having one or more subjects on the node. One or more authorities each sign a corresponding cryptographic authorization permit (CAP), for example one based on an X.509 Certificate, to authorize a subject in one partition to access a resource in a different partition. The validity of the CAP is determined in part by the verification of an asymmetric cryptographic signature. The cryptographic signature contained in the CAP can be based on any one or combination of RSA, DSA, or ECDSA signatures. In one embodiment, the authorization for the access privilege is based on a cryptographic signature made with a private key corresponding to a public key associated with at least one of the one or more authorities that may be independent of each other.

According to another aspect of the present invention, an information system has a node associated with one or more channels. A partitioning communication system (PCS) separates the one or more channels from each other and a separation kernel (SK) running on the node creates a plurality of partitions having one or more subjects. At least one partition on the node communicates messages over the one or more channels based on a channel access privilege such that one or more authorities each sign a cryptographic authorization permit (CAP) to authorize the channel access privilege. In one embodiment, the SK creates a PCS-specific partition and at least one application partition. One or more CAPs are stored in the PCS specific partition and the messages are communicated with the application partition via the PCS-specific partition in accordance with the security policy defined by the CAPs.

A secure information system according to another aspect of the present invention has a first node that is partitioned by a first separation kernel to a plurality of first partitions and a second node that is partitioned by a second separation kernel to a plurality of second partitions, with each partition having one or more corresponding subjects. One or more channels are used for communicating messages between the first node and second node and a partitioning communication system (PCS) separates the one or more channels from each other. The plurality of first partitions on the first node communicates messages over the one or more channels based on a first channel access privilege and the plurality of second partitions on the second node communicates messages over the one or more channels based on a second channel access privilege. One or more authorities each sign a cryptographic authorization permit (CAPs) to authorize the first and second channel access privileges.

DETAILED DESCRIPTION OF THE INVENTION

A system and method for securing information has a node that runs a separation kernel (SK) for creating a plurality of partitions that interact with each other based on a policy that specifies one or more privileges. Each privilege describes a particular form of interaction, and may be allowed or denied separately. A privilege consists of an Identifier, a permitted form of interaction, identifiers associated with the authorities that control the privilege, and a description of the evidence of approval from the controlling authorities necessary to grant the privilege. One or more authorities each sign a cryptographic authorization permit (CAP) to grant one or more identified subjects one or more access privileges. In one embodiment, the authorizations for the one or more access privileges are based on public keys issued by one or more responsible authorities and each CAP comprises a cryptographic certificate digitally signed by such authority. Access to a given privilege may require a subject to present a CAP identifying that subject and containing the cryptographic signature of one authority, all authorities, or some subset of the authorities that control the privilege. The definition of the privilege includes the public keys of the authorities whose approval is necessary to grant that privilege, and the combination of their approval necessary to grant that privilege.

According to some of the more detailed features of the present invention, the privileges granted by a CAP represent changes to the parameters of the security policy implemented by a Separation Kernel or a Partitioning Communications System (PCS). A Separation Kernel may receive one or more CAPs and, upon determining the validity of the CAPs, modify its security policy to implement the change represented by the CAPs. Additionally, A PCS running on a separation kernel may evaluate one or more CAPs that it receives and modify its own security policy. The determination of a CAP's validity can be made by the Separation Kernel, the Partitioning Communications System, or an independent partition on the Separation Kernel whose services are shared by the SK and the PCS.

Figure 1:
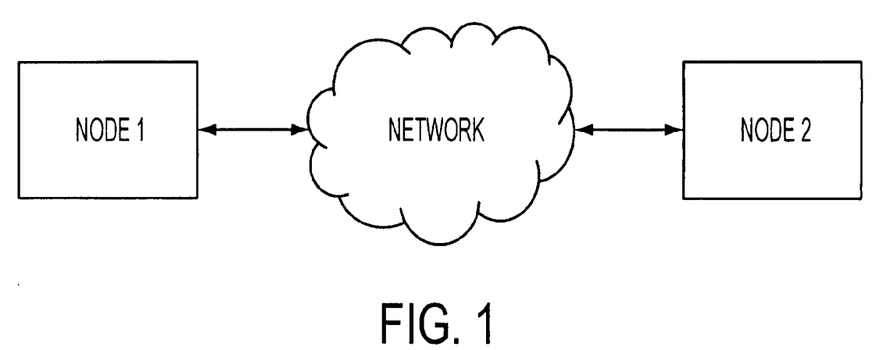
FIG. 1 is a simple block diagram of a system that implements the present invention.

FIG. 1 shows a block diagram of an exemplary information system that advantageously implements the present invention. The information system comprises a node 1, which communicates with a node 2 over one or more channels associated with a network. The communication is accomplished using any suitable combination of physical, link, network, or transport layers, as necessary, to support any desired standardized, non-standardized or proprietary protocols. Examples of transport protocols that are suitable for transporting messages across the system of the invention comprise any of the known real time or non-real time protocols. The transport layer may also support transport technologies with or without Quality of Service (QoS), such as ATM or TCP/IP. The link connecting the nodes 1 and 2 can be a wired link, such as the one defined by IEEE 802.3, or a wireless link, such as the one defined by IEEE 802.11x. Examples of the physical layers that can be used in the present invention include twisted pair, coaxial cable, optical cable, or any known suitable wired or wireless technologies. An exemplary distributed system in which the present invention is used can comprise any type of embedded system where the nodes communicate with each other in a tightly integrated manner, for example across a VME back plane. In one embodiment, each node runs under the control of an operating system that supports predictable worst-case bounds (real-time) processor scheduling.

According to one embodiment of the present invention, at least one of the node shown in FIG. 1, but preferably both, run under the control a corresponding Separation Kernel (SK). One exemplary class of SK that may be used in the present invention is described in a Protection Profile (PP) published by the National Security Agency (NSA) entitled "U.S. Government Protection Profile for Separation Kernels in Environment Requiring High Robustness" (SKPP), which is hereby incorporated by reference in its entirety.

The present invention secures information resources accessible by one or more parties. As herein defined, a party comprises any entity, partition, application, node, system, computer or device that is part of any resource that is subject to security policies, including but not limited to policies controlling access to one or more communication channels and data storage mediums. According to one aspect of the present invention, independent authorities responsible for the protection of information resources authorize access privileges to such resources using cryptographic authorization permits (CAPs), which are digital certificates granting a subject a privilege. Each responsible authority produces the necessary cryptographic data values in terms of public-keys and private-keys, digital signatures, and related information for implementing various security policies (SPs). Using CAPs, the present invention enables independent authorities to authorize security policies for accessing information resources by including identifiers associated with the authorities in the name of the resources, and requiring approval from those authorities to grant access to those resources.

According to one embodiment, the present invention accommodates issuance of CAPs by authorities that authorize access privileges to subjects in partitions defined by one or more SKs on the same node or on different nodes coupled to each other via one or more communication channels. The authorities in the present invention do not merely authenticate the identity of the communicating parties. Rather, they are also involved with authenticating access privileges associated with information resources that are under SK control. In this way, the present invention enables creating secure information systems having separate policy-approval and policy-implementation processes. Policy implementers request approvals from authorities responsible for granting access privileges to information resources. Such authorities manifest their grants via digital signatures contained in issued CAPs, attesting to access privileges to information resources accessible by subjects in partitions on the same node or different nodes. Policy implementers use the CAPs to generate security policy files that enforce the SP by incorporating them into the deployed information systems. This process allows the authorities to control what implemented secure systems can or can not do without requiring all policy implementers to obtain the highest levels of trustworthiness clearance. Security in the system is ultimately controlled by cryptographic data values contained in public- and private-key pairs, digital signatures, and symmetric keys.

The present invention enforces security policies with no pre-set limits on the number of system nodes. The present invention does not require any limits on the number of security domains recognized or the information-flow policies enforced on these domains. Consequently, the security policies of the system can be changed dynamically as the need arises, without changing the deployed software. Moreover, systems created by the present invention do not depend on access to third parties (including authorities) to perform a privilege check. Privilege checks can be performed by any entity possessing a CAP and the public keys of the authorities that control the resources to which the privilege corresponds. Such systems continue to function with little or no degradation in performance or security when any node is lost or malfunctions. The present invention can be used for military applications, classification levels, need-to-know restrictions, banking, clearing centers using separate partitions for separate accounts.

Each SK provides to its hosted software programs high-assurance partitioning and information flow control properties that are both tamperproof and non-bypassable. The SK comprises hardware and/or software mechanism whose primary function is to create multiple partitions for a node. A partition is an abstraction implemented by the SK from resources under its control according to a configuration data that implements all or portions of one or more SPs. As described further in detail, the present invention uses SPs that are signed by authorities for implementing security parameters of the system. Each SK partition comprises at least one subject and/or resource. A subject is any active entity within the scope of control of the node that performs a function, for example, an inter-node communication function. A resource comprises any hardware, firmware, data, and/or software that is executed, utilized, created, protected, or exported in each node. Resources may be used by subjects individually or simultaneously to allows the subjects to access information within the resources. Resources may also comprise transport, network, link, communication bus, I/O bus, memory bus, hardware or software as well as socket library, protocol stack, device driver, etc. Resources can also comprise encryption/decryption units implementing any suitable asymmetric and/or symmetric key cryptography algorithms and methods according to the present invention.

The SK uses a set of configuration data to establish partition definitions and allocation of resources to partitions. The SK configuration data provides the control information used by the node during initialization to define the secure initial state and its behavior during runtime. The SK configuration data assigns (binds) each resource to a single partition for the purposes of defining such partitions. Every subject is also assigned to a single partition by the SK configuration data for the purposes of defining partitions. The SK configuration data consists of SK flow policy configuration data and supporting policy configuration data, which define the information flow control and partition flow control policies for communication between and within partitions. SK non-flow policy configuration data defines all configurable SK critical data, including cryptographic configuration parameters for implementing symmetric and/or asymmetric key cryptography according to the present invention. The content and format of the SK configuration data may take different forms, depending on the scope and granularity of the information flow control and partition flow control policies that are enforced as well as on other factors of system design. The representation format for the configuration data can comprise any suitable form or specification, either explicit or derived.

Figure 2:
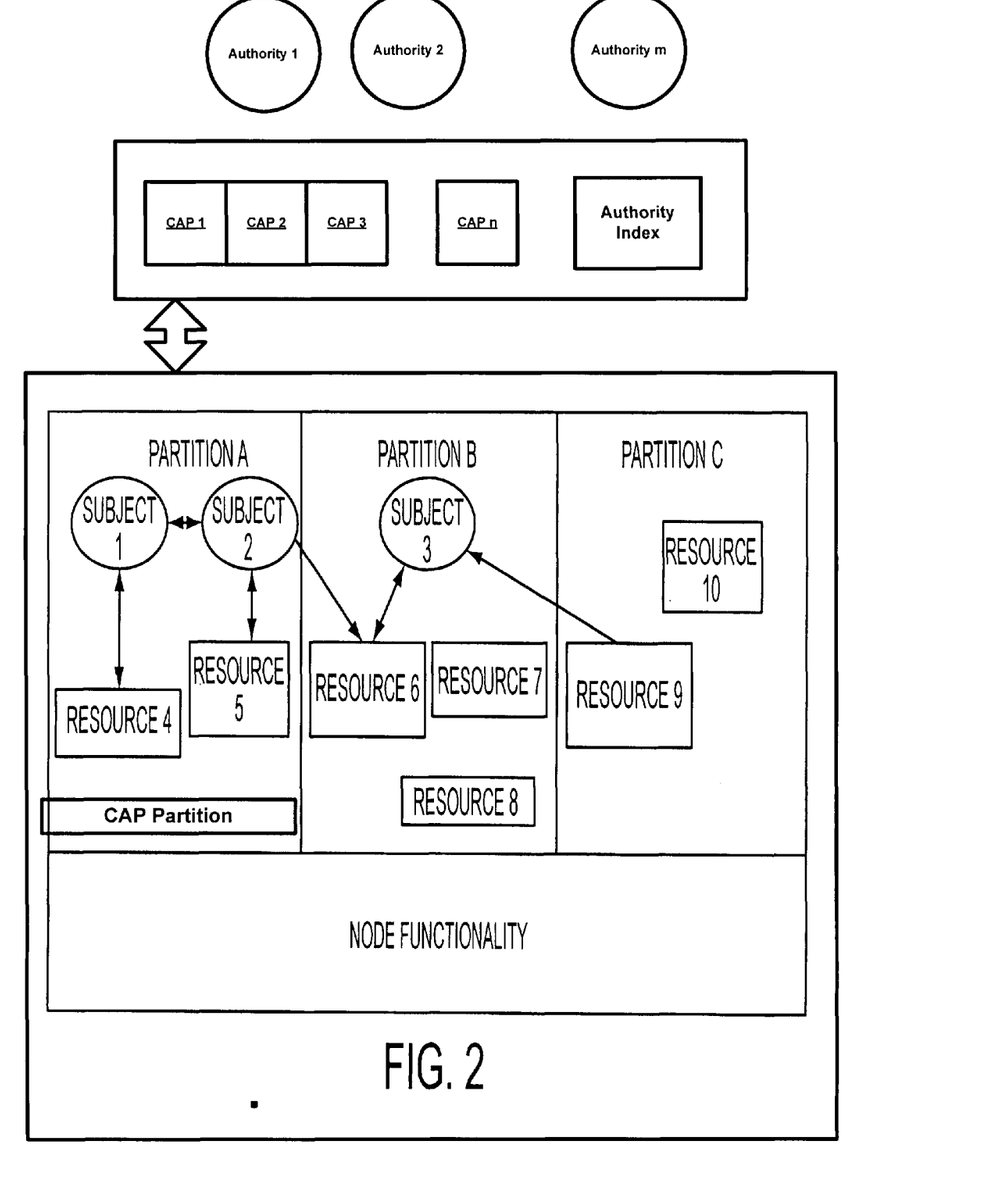
FIG. 2 is a logical block diagram of a node used in the system of FIG. 1 that implements one embodiment of the present invention.

FIG. 2 illustrates an exemplary embodiment of a node operating under the control of a SK, which serves to protect the subjects and resources running in partitions on the node from information flows that violate the SP. The SK separates resources into policy-based equivalence classes and controls information flows between subjects and resources assigned to the partitions according to the SK's configuration data. In one embodiment, a node comprises any hardware resource running a single SK, where the SK controls information flow between and/or within the multiple partitions of the node according to the SK configuration data. In particular, each node runs its own SK which protects resources unique to that node. Preferably, the SK configuration data specification is unambiguous and allows a human examiner (possibly with tool support) to determine whether any given potential connection would be allowed by the policy, and every resource allocation rule specified by the policy. The present invention uses various tools for creating or obtaining public and private keys and digitally signed approvals needed to implement desired SPs.

A node has an associated node identity (NI), which comprises a pair of public-key and private-key. Each partition on the nodes also has a corresponding Partition Identity (PI). A PI for each partition comprises a pair of values consisting of the public-key of the NI of the node on which the partition is created and an index which refers to the partition on the node. According to one embodiment of the present invention, inter-node access amongst partitions are managed by independent authorities. Under this arrangement, a node, such as the one shown in FIG. 2, is associated with one or more information resources, where a separation kernel (SK) defines a plurality of partitions on the nodes. Each resource on the SK is controlled by one or more authorities who must approve access to those resources. These authorities, $Authority_1$-$Authority_m$, sign corresponding CAPs, $CAP_1$-$CAP_n$, to authorize information resource access privilege between at least two such partitions.

This exemplary embodiment of the present invention uses two types of partitions: a CAP partition and application partitions (also called user partitions). All intra-node interactions between the partitions are controlled by the CAP partition of the node, in conjunction with the Separation Kernel. The CAP partition communicates only with the Separation Kernel, other partitions on its own node, and CAP partitions on other nodes, as described later in more detail. Each node has at least one CAP partition (also called PCS-specific partition in intra-node communication applications, as described later), although in particular implementations, the partition's functions may be implemented using multiple partitions. The CAP partition securely stores (in a secret and non-forgeable manner) security data values, including node's private and public keys, other nodes public keys and CAP's that implement system security. The application partitions communicate with other partitions on the same node, including the CAP partition, through means authorized by the local SK according to corresponding configuration data and subject to authorization permit parameter(s) of the CAPs. The CAP partition provides a mechanism by which the security parameters of the SK's security policy may be changed upon receipt of a CAP, signed by the authorities that control the parameter in question, which authorizes the parameter to change.

According to another embodiment, the present invention is implemented amongst a plurality of nodes using a Partitioning Communications System (PCS). Under this embodiment CAPS are used to implement inter-node communication policies amongst the plurality of nodes. The partition-level intra-node implementation of the invention as described in FIG. 2 can be combined with the inter-node communication implementation according to this embodiment to implement certificate based security policies at partition and node levels.

PCS is disclosed in the U.S. patent application Ser. No. 11/125099 filed on May 10, 2005 and assigned to the assignee of the present invention, which is hereby incorporated by reference in its entirety. PCS supports Multi Level Secure (MLS) systems that enables secure, distributed communications upon which many higher-level technologies may be layered. As such, PCS can be used as a building block for implementing trustworthy distributed systems. PCS is a communication controller within a node that communicates data with another node over one or more channels. PCS supports data-flow policies among partitions that are managed by SKs. PCS deploys a combination of hardware and/or software, which provides inter-node communications amongst nodes that are run under the control of a corresponding SK. In this way, PCS enables creating multi-domain networks whose security is not dependent on physical hardware separation and protection or on any particular network hardware.

In one exemplary embodiment, the PCS mediates interactions via channels according to two security policies: the channel connectivity policy and the resource management policy. The channel connectivity policy defines the allowable connections. Essentially, this policy is an access privilege control policy that defines all access privileges. The resource management policy describes how the shared communications resources used for implementing channels are to be allocated between channels and the extent to which channels may influence each other (either cooperatively or inadvertently) through the use of shared resources.

A channel comprises a connection from a source partition to one or more destination partitions existing on the same or different nodes, including any physical or logical components, for one-way flow of inbound or outbound information. All communication between partitions for separate nodes in the network is accomplished by communicating, i.e., reading or writing, messages over the channels. Each partition can have a write access privilege, a read access privilege, or both. The present invention uses channels for implementing point-to-point, point-to-multipoint, or multipoint-to-multipoint communications between nodes. Each channel has an associated symmetric encryption/decryption key for the communicated messaged. The symmetric key is a shared secrete key for amongst the parties used for communicating messages over the channels once access privilege is authorized. The shared secret key is subject to change periodically in accordance with defined security parameters.

Thus, a channel according to the present invention is associated with one or more access privileges. A read access privilege allows authorized partitions to read messages from the channels and a write access privilege allows authorized partitions to write messages to the channels. The signed CAPs issued by one or more authorities grant partitions read, write, or read and write access privileges to the channels. Every channel has one or more associated authorities that are responsible for granting the necessary access privileges for reading messages from or writing messages to that channel. The Identity of each channel includes the public keys of the authorities that control read and write privileges to that channel. Channels that are otherwise identical, but having identities with different controlling authorities are considered to be different channels by the present invention.

Figure 3:
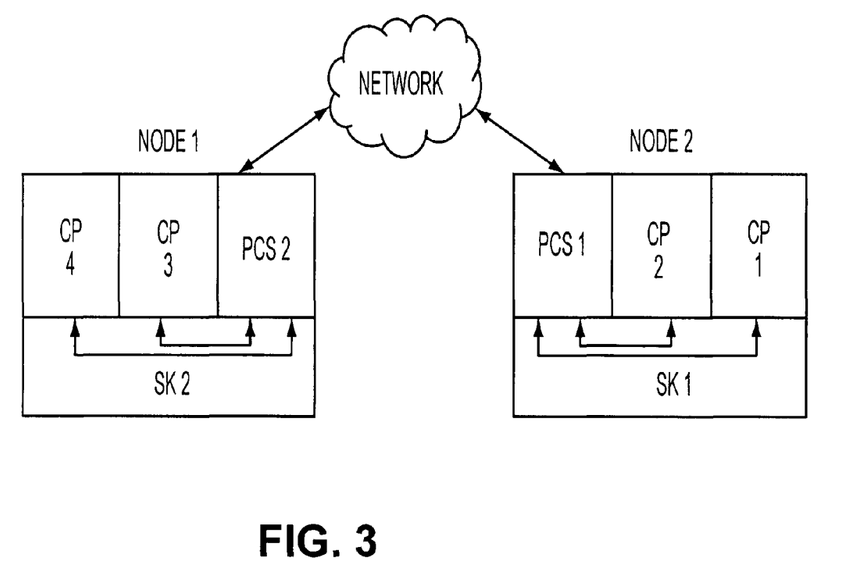
FIG. 3 is a logical block diagram of a system that uses a PCS to communicate messages between two nodes.

FIG. 3 shows an exemplary implementation of the system that provides inter-node communication between two nodes 1 and 2 according to an exemplary embodiment of the present invention. Each node runs a corresponding SK1 and SK2, which provides for memory allocation, loading of the code, assigning communication resources, I/O handling etc. As shown, each of the SK1 and SK2 loads corresponding PCS 1 and PCS2 into the nodes 1 and 2 and partitions the corresponding node. SK1 partitions node 1 to Client Partitions (CPs) CP1 and CP2, which are configured for access by PCS 1. SK2 partitions node 2 to CP3 and CP4, which are configured for access by PCS2. Once the SK is initialized, a PCS control partition loads PCS configuration data, including the channel connectivity policy, the resource management policy, and the network description.

Figure 4:
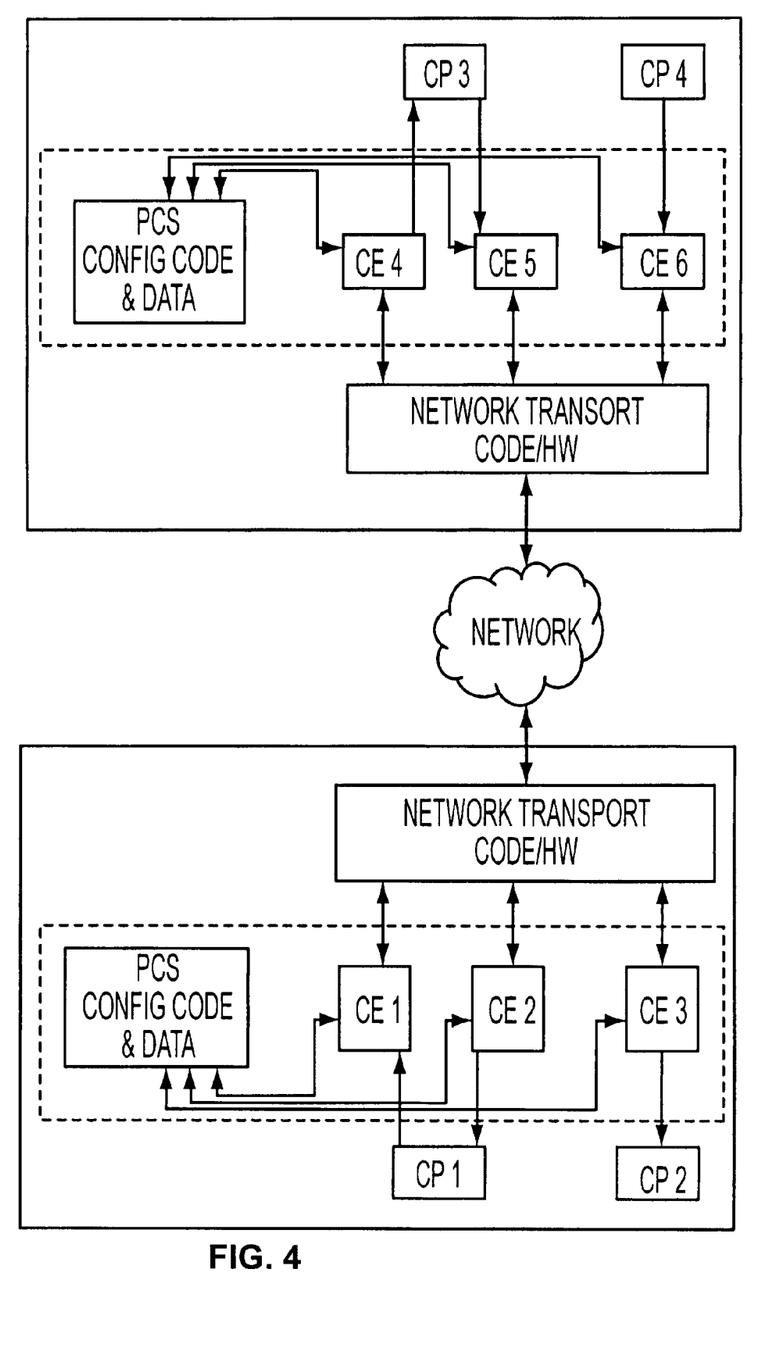
FIG. 4 is a more detailed logical block diagram of the system of FIG. 3.

FIG. 4 shows a more detailed embodiment of the system of FIG. 3. As shown by the dotted line, the PCS maintains a domain for its own execution that protects itself and its resources from external tampering or unauthorized disclosure by untrusted subjects and agents. The PCS domain comprises a number of partitions that implement channels via channel endpoint (CE) partitions. PCS configuration code and data partition is responsible for managing configuration data and bindings. The PCS configuration data defines bindings to CEs at either the subject or partition level, as supported by the underlying SK.

Before communicating messages, PCS ensures that the nodes participating in the communication have consistent configuration data that authorizes that communication. For all shared resources, such as access hardware/software, cryptographic hardware/software, etc., PCS initializes and test those resources. For every channel, a sending CE performs mutual authentication with every receiving CE, and establishes a shared secret key. The mutual authentication, which is cryptographic, is associated with authorizing access privileges to the channels.

This authentication consists of verifying the identity of the communicating subjects as well as their access privileges. Verification of subject identity may be performed by authenticating the identity of the containing node and/or partition using a mutual authentication protocol such as the Elliptic Curve MQV (ECMQV) protocol, as standardized in ANSI X9.63, IEEE 1363-2000 and ISO/IEC 15946-3. Such protocols are also disclosed in L. Law, A. Menezes, M. Qu, J Solinas and S. Vanstone, "An efficient protocol for authenticated key agreement" in Designs Codes and Cryptography, 28:119-134, 2003 as well as U.S. Pat. No. 5,761,305 titled "Key agreement and transport protocol with implicit signatures."

A successful run of this protocol will result in a shared secret key known only to the CE's performing the authentication. Verification of the privilege to communicate requires verification of signatures contained in CAPs that authorize some subjects to access the channel. Further checks must be made to ensure that those signatures correspond to the authorities identified as responsible for protecting the channel in that channels identity. Lastly, the CE's match the subjects named in the CAP against the subjects whose identities were verified in the previous step. If all CE's successfully perform the preceding steps. The shared secret key is used for encryption and decryption of messages communicated over the channels.

Once initialization of the shared resources and channels is completed, the CPs are notified that the channels are ready for communication of messages. Access to the channels requires independent permits by one or more authorities that are responsible for issuing CAPS in accordance with a promulgated SP. Channel access may require independent authorizations by multiple authorities. As stated above, the present invention uses policies that are signed by authorities for implementing security parameters. In an exemplary embodiment, a signed policy comprises a list of CAPs and a list of authority public keys. The policy is signed by one or more of the authorities that are responsible for the protection of the channels.

The present invention uses PCS-specific partitions to implement inter-node communication between application partitions (also called user partitions). All communications between the nodes are carried out through the PCS-specific partitions on each node. Each PCS-specific partition communicates only with other partitions on its own node as well as PCS-specific partitions on other nodes. Each node has at least one PCS-specific partition, although in particular implementations, the partition's functions may be implemented using multiple partitions. Each PCS-specific partition stores in a secret and non-forgeable manner security data values, including node's private and public keys, other nodes public keys and CAPs that implement system security. The application partitions communicate with other partitions on the same node, including the PCS-specific partitions, through means authorized by the local SK according to corresponding configuration data. The application partitions communicate with partitions on other nodes through respective PCS-specific partitions on their own nodes. Such communications is accomplished using suitable APIs adapted to each node's PCS-specific partition.

What is claimed as new and desired to be protected by Letters Patent of the United States is:

1. A node for an information system, comprising: a plurality of partitions on the node, wherein at least one partition has one or more subjects and at least one other partition has one or more resources, wherein access to a resource requires processing a cryptographic authorization permit (CAP) that is signed by two or more authorities, said two or more authorities each sign a CAP to authorize a subject in the at least one partition to access a resource in the at least one other partition, wherein the signature of each one of the two or more authorities signing the CAP is validated to grant access to the resource.

2. The node of claim 1, wherein the authorization is based on a cryptographic signature made with a private key corresponding to a public key associated with at least one of the one or more authorities.

3. The node of claim 1, wherein the two or more authorities are independent of each other.

4. The node of claim 1, wherein the CAP is based on an X.509 Certificate.

5. The node of claim 1, wherein the validity of the CAP is determined in part by the verification of an asymmetric cryptographic signature.

6. The node of claim 5, where the asymmetric cryptographic signature is based on at least one of RSA, DSA, or ECDSA signatures.

7. In an information system, a node associated with one or more channels comprising: a partitioning communication system (PCS) that separates the one or more channels from each other; a plurality of partitions, wherein at least one partition on the node communicates messages over the one or more channels based on a channel access privilege, wherein access to a channel requires processing a cryptographic authorization permit (CAP) that is signed by two or more authorities, said two or more authorities each sign a CAP to authorize the channel access privilege, wherein the signature of each one of the two or more authorities signing the CAP is validated to grant access to the channel.

8. The information system of claim 7, wherein the plurality of partitions comprise a PCS-specific partition and at least one application partition, wherein one or more CAPS are stored in the PCS specific partition and the messages are communicated with the at least one application partition via the PCS-specific partition.

9. The information system of claim 7, wherein the authorization for the access privilege is based on a cryptographic signature made with a private key corresponding to a public key associated with at least one of the two or more authorities.

10. The information system of claim 7, wherein the two or more authorities are independent of each other.

11. The information system of claim 7, wherein at least one partition has at least of a subject and a resources, and wherein the node is identified by corresponding node public and private keys issued by at least one of the two or more authorities, and wherein the public and private keys are used as identifiers for at least one of a subject and a resource in a partition.

12. The information system of claim 7, wherein the messages are communicated over the one or more channels based on a shared secret key.

13. The information system of claim 7 wherein the CAP is based on an X.509 Certificate.

14. The information system of claim 7, wherein the validity of the CAP is determined in part by the verification of an asymmetric cryptographic signature.

15. The information system of claim 7, where the cryptographic signature contained in the CAP is based on at least one of RSA, DSA, or ECDSA signatures.

16. A secure information system, comprising: a first node that is partitioned to a plurality of first partitions and a second node that is partitioned to a plurality of second partitions; one or more channels for communicating messages between the first node and second node; a partitioning communication system (PCS) that separates the one or more channels from each other, wherein at least one of the plurality of first partitions on the first node communicates messages over the one or more channels based on a first channel access privilege and at least one of the plurality of second partitions on the second node communicates messages over the one or more channels based on a second channel access privilege, wherein access to a channel requires processing a cryptographic authorization permit (CAP) that is signed by two or more authorities, said two or more authorities each sign a CAP to authorize the first and second channel access privileges, wherein the signature of each one of the two or more authorities signing the CAP is validated to grant access to the channel.

17. The secure information system of claim 16, wherein the authorities are independent of each other.

18. The information system of claim 16 wherein the CAP is based on an X.509 Certificate.

19. The information system of claim 16, wherein the validity of the CAP is determined in part by the verification of an asymmetric cryptographic signature.

20. The information system of claim 16, where the cryptographic signature contained in the CAP is based on at least one of RSA, DSA, or ECDSA signatures.

21. A node for an information system, comprising: a plurality of partitions having resources comprising hardware that are separated from each other, wherein at least one partition has one or more subjects, wherein access to a resource requires processing a cryptographic authorization permit (CAP) that is signed by two or more authorities, said two or more authorities each sign a CAP to authorize a subject in the at least one partition to access a resource in the at least one other partition, wherein the signature of each one of the two or more authorities signing the CAP is validated to grant access to the resource.

22. A method for securing information comprising: receiving a request to access a resource in a first partition from a subject in a second partition, wherein the first and second partitions comprise resources separated by logical components; receiving a cryptographic authorization permit (CAP) authorizing the subject to access the resource, wherein the CAP is signed by two or more authority and identifies the subject and cryptographic signature; validating the CAP based on the two or more signature of the authority; and granting access to the resource based on the validation of the CAP.

23. A node for an information system, comprising:
a plurality of partitions on the node, wherein at least one partition has one or more subjects and at least one other partition has one or more resources, wherein access to a resource requires processing a cryptographic authorization permit (CAP), wherein a plurality of authorities each sign the CAP to authorize a subject in the at least one partition to access a resource in the at least one other partition, wherein the signature of each one of the plurality of authorities signing the CAP is validated to grant access to the resource.

24. A node for an information system, comprising:
a plurality of partitions on the node, wherein at least one partition has one or more subjects and at least one other partition has one or more resources, wherein access to a resource requires processing a cryptographic authorization permit (CAP) that is signed by one or more authorities, said one or more authorities each sign a CAP to authorize a subject in the at least one partition to access a resource in the at least one other partition, wherein the signature of each one of the one or more authorities signing the CAP is validated to grant access to the resource,
wherein the plurality of partitions comprise a PCS-specific partition and at least one application partition, wherein one or more CAPs are stored in the PCS specific partition and the CAP is validated via the PCS-specific partition.

* * * * *

UNITED STATES PATENT AND TRADEMARK OFFICE
CERTIFICATE OF CORRECTION

| | | |
|---|---|---|
| PATENT NO. | : 8,443,191 B2 | Page 1 of 1 |
| APPLICATION NO. | : 11/783359 | |
| DATED | : May 14, 2013 | |
| INVENTOR(S) | : Beckwith et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1041 days.

Signed and Sealed this
Sixteenth Day of December, 2014

Michelle K. Lee
*Deputy Director of the United States Patent and Trademark Office*